No. 784,953.

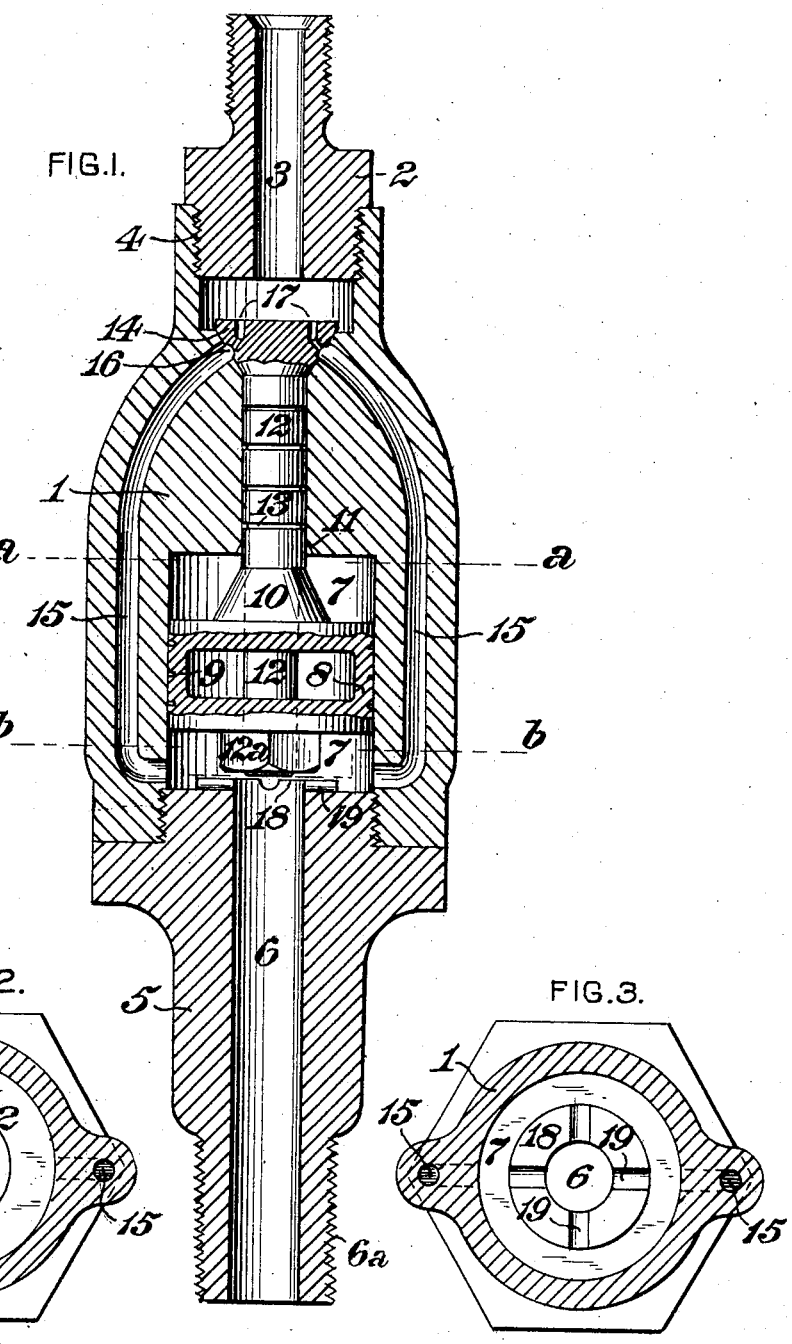

Patented March 14, 1905.

UNITED STATES PATENT OFFICE.

DONALD R. MacBAIN, OF JACKSON, MICHIGAN, ASSIGNOR TO JOEL S. COFFIN AND SAMUEL G. ALLEN, OF FRANKLIN, PENNSYLVANIA.

LUBRICATOR.

SPECIFICATION forming part of Letters Patent No. 784,953, dated March 14, 1905.

Application filed October 27, 1904. Serial No. 230,167.

*To all whom it may concern:*

Be it known that I, DONALD R. MACBAIN, of Jackson, in the county of Jackson and State of Michigan, have invented a certain new and useful Improvement in Lubricators, of which improvement the following is a specification.

My invention relates generally to sight-feed lubricators for the valve-chests and cylinders of locomotives and other steam-engines, and more particularly to devices of the class or type known as "automatic choke-plugs," which are employed, in connection with lubricators of this character, for controlling the supply of lubricant to the valve-chests of engines.

The object of my invention is to provide an appliance of this type which shall be of simple and inexpensive construction, shall present a free and unobstructed passage of the full area of the oil-pipe from the lubricator sight-feed glass to the valve-chest when the engine is working steam and restricted passages of sufficient area for the supply of oil when the engine is "drifting" or running with steam shut off, and shall be exempt from shocks due to sudden opening of the controlling-valve and from inoperativeness if working parts should accidentally become detached.

The improvement claimed is hereinafter fully set forth.

In the accompanying drawings, Figure 1 is a longitudinal central section through a lubricator appliance, illustrating an application of my invention; and Figs. 2 and 3, transverse sections through the same on the lines $a\ a$ and $b\ b$, respectively, of Fig. 1.

In the practice of my invention I provide a body or casing 1, which is internally threaded at its upper end to receive a cap 2, through which extends an oil-supply passage 3, corresponding in transverse sectional area with the oil-pipe leading from the lubricator, which is connected to the cap by an external thread 4. The lower end of the body is internally threaded to engage a valve-chest plug 5, through which extends an oil-delivery passage 6, corresponding in transverse sectional area with the oil-supply passage and the oil-pipe leading from the lubricator, the plug 5 being connected to the valve-chest by means of an external thread $6^a$ on its lower end.

A piston-chamber 7, which is continuously open at its lower end to the oil-delivery pipe 6, is formed in the body 1, and a piston 8 is fitted to work in said chamber, the periphery of the piston being preferably provided with water-grooves 9 to prevent leakage from one of its sides to the other, or, if desired, packing-rings may be fitted in the piston for this purpose. The piston-chamber is made of greater height than would be required to permit the determined transverse of the piston in order that the space therein above the piston may serve as a compression-chamber. A conical compression-valve 10, which is formed centrally on the upper side of the piston 8, is adapted to close on a seat 11 at the top of the piston-chamber surrounding the central bore extending therefrom hereinafter specified. The piston, which is made hollow to reduce its weight and facilitate its operation, is fitted on a stem 12 and is secured in position thereon by a nut $12^a$ engaging a thread on the lower end thereof. The stem 12 fits truly in a central bore in the body extending from the piston-chamber to the upper ends of the main oil-ports 15, water-grooves 13 being formed on the periphery of the stem to prevent leakage, and carries on its upper end a controlling-valve 14, which is of the lift or puppet type and of materially smaller diameter than the piston and which when the piston is in its lowest position seats above the upper ends of two main oil ports or passages 15, which are cored on the outside of the body 1 and have their lower ends continuously open to the piston-chamber 7, on the lower side of the piston.

A peripheral groove 16, which communicates with the ports 15 when the valve 14 is seated, is formed in said valve, and two small ports 17, which may be termed "drifting-ports," extend from the top of the valve into the groove 16. It will therefore be seen that said ports 15 are, when the valve is seated, in communication with the oil-supply passage 3 through the restricted-diameter drifting-ports 17.

In order to prevent the oil-delivery passage 6 from being covered and closed by the nut 12ª in the event of the latter becoming accidentally detached from the piston-stem, an annular bearing 18 is formed on the upper end of the valve-chest plug 5 surrounding the opening of the oil-delivery passage 6, and radial oil-passages 19 extend from the oil-delivery passage to the periphery of the bearing. If the nut should become detached from the stem, it will rest upon the bearing 18, and communication between the main oil-ports 15 and the oil-delivery passage will be maintained through the radial passages 19.

In the operation of the appliance when the engine is running under steam and the pressure in the valve-chest is, say, not less than forty per cent. of that in the boiler action of the the valve-chest pressure upon the lower side of the piston and upon the controlling-valve (through the main oil-ports) will raise the piston and unseat the connected controlling-valve, thereby opening communication between the oil-supply and oil-delivery passages, through the two main oil-ports 15, the combined transverse sectional area of which is substantially equal to that of the communicating supply and delivery passages, thereby presenting an unobstructed avenue for the passage of lubricant from the sight-feed glass of the lubricator to the valve-chest, and obviating the retention of water of condensation in the oil-pipe, which is a frequent and a serious objection in lubricating appliances of the ordinary construction. By reason of the differential areas of the piston and controlling-valve the piston will be raised against the pressure in the oil-pipe by a comparatively low pressure in the valve-chest, thereby insuring positive action at all times when the engine is running under steam.

When the engine is drifting or running with steam shut off the pressure from the boiler acting through the oil-pipe and communicating oil-supply passage upon the top of the controlling-valve forces the latter and the connected piston downward against the then lower pressure in the valve-chest, thereby bringing the controlling-valve to its seat in the body and cutting off communication between the oil-supply and oil-delivery passages, except to the limited but sufficient extent which is permitted by the restricted ports of the valve. A proper supply of lubricant to the valve-chest and cylinder is thus insured under all running conditions of the engine. The drifting-ports afford enough area for the passage of the lubricant, while preventing more steam from entering the valve-chest when the throttle is closed than will promptly condense and obviating any liability to move the engine by such steam. Shocks which might otherwise be caused by the opening of the controlling-valve too quickly are prevented by the air confined in the chamber above the piston by the closure of the compression-valve on the upper side of the piston, the adjoining portion of the piston-chamber acting as a compression-chamber or dash-pot, which prevents the sudden opening of the controlling-valve and accompanying hammering action.

The provision of the two independent main oil-ports is advantageous in the particular that if one of them should become clogged or stopped up the other will remain available for the supply of lubricant.

The appliance does not involve any change in the construction or connections of the lubricator proper, and it may be used in connection with any lubricator that will measure the oil by the drop, if the steam-passage from the boiler to the lubricator is of greater transverse area than the oil-pipe leading from the lubricator to the valve-chest.

I claim as my invention and desire to secure by Letters Patent—

1. The combination, in a lubricator device, of a body or casing, a valve-chest plug having a central unobstructed delivery-passage and secured to one end of the body, a cap having a central unobstructed oil-supply passage and secured to the opposite end of the body, there being independent main oil-ports cored on the outside of the body and connecting the oil-supply and oil-delivery passages, a controlling-valve governing communication between the oil-supply passage and the main oil-ports, a restricted passage being provided in said valve establishing communication between said passage and ports, and a piston connected to and of greater diameter than the controlling-valve, and subject throughout its area on the side further from said valve to the pressure in the oil-delivery passage.

2. The combination, in a lubricator device, of a body or casing, a valve-chest plug having a central unobstructed oil-delivery passage and secured to one end of the body, a cap having a central unobstructed oil-passage and secured to the opposite end of the body, there being independent main oil-ports cored on the outside of the body and connecting the oil-supply and oil-delivery passages, a piston fitting a chamber in the body which is open unobstructedly to the oil-delivery passage, a stem connected to said piston and fitting, throughout its length, in a central bore in the body, a compression-valve carried by the stem and seating around the end of the bore, a controlling-valve of smaller diameter than the piston, connected to the stem and governing communication between the oil-supply passage and the main oil-ports, and a restricted passage being provided in said valve establishing communication between said passage and ports.

3. The combination, in a lubricator appliance, of a body or casing, a piston-chamber therein, a valve-chest plug connected to the body, and having an oil-delivery passage open directly to the piston-chamber, a cap connected to the opposite end of the body and having an oil-supply passage opening thereinto, a piston fitted in the piston-chamber, there being two main oil-ports cored on opposite sides of the body and open to the lower end of the piston-chamber, a stem connected to the piston and fitting a central bore in the body, a controlling-valve, of smaller diameter than the piston, fixed upon the stem and adapted to govern communication between the oil-supply passage and the main oil-ports, and a restricted passage being provided through the controlling-valve which communicates, when the valve is seated, with the main oil-ports.

4. The combination, in a lubricator appliance, of a body or casing, a piston-chamber therein, a valve-chest plug connected to the body, and having an oil-delivery passage open directly to the piston-chamber, a cap connected to the opposite end of the body and having an oil-supply passage opening thereinto, a piston fitted in the piston-chamber, there being two main oil-ports cored on opposite sides of the body and open to the lower end of the piston-chamber, a stem connected to the piston and fitting a central bore in the body, a controlling-valve, of smaller diameter than the piston, fixed upon the stem and adapted to govern communication between the oil-supply passage and the main oil-ports, a peripheral groove in said valve, communicating, when the valve is seated, with the main oil-ports, and a restricted passage being provided through the valve opening into said peripheral groove.

5. The combination, in a lubricator appliance, of a body or casing, a piston-chamber therein, a valve-chest plug connected to the body and having an oil-delivery passage open directly to the piston-chamber, a cap connected to the opposite end of the body, and having an oil-supply passage opening thereinto, a piston fitted in the piston-chamber, there being two main oil-ports cored on opposite sides of the body and open to the lower end of the piston-chamber, a stem connected to the piston and fitting a central bore in the body, a compression-valve carried by the stem and seating around the bore at the adjoining end of the piston-chamber, a controlling-valve, of smaller diameter than the piston, fixed upon the stem and adapted to govern communication between the oil-supply passage and the main oil-ports, and a restricted passage being provided through the controlling-valve which communicates, when the valve is seated, with the main oil-ports.

6. The combination, in a lubricator appliance, of a body or casing, a piston-chamber therein, a valve-chest plug connected to the body and having an oil-delivery passage opening below and directly into the piston-chamber, a cap connected to the opposite end of the body and having an oil-supply passage opening thereinto, a piston fitted in the piston-chamber, there being two main oil-ports cored on opposite sides of the body and open to the lower end of the piston-chamber, a stem connected to the piston and fitting a central bore in the body, a controlling-valve, of smaller diameter than the piston, fixed upon the stem and adapted to govern communication between the oil-supply passage and the main oil-ports, a restricted passage being provided through the controlling-valve which communicates, when the valve is seated, with the main oil-ports, an annular bearing on the upper end of the valve-chest plug, surrounding the oil-delivery passage and serving as a rest for the piston or its connecting device if detached from the stem, and radial oil-passages being provided extending from the oil-delivery passage to the periphery of the bearing.

DONALD R. MacBAIN.

Witnesses:
FRANK PELHAM,
BLANCHE FULLER.